Figure 1:
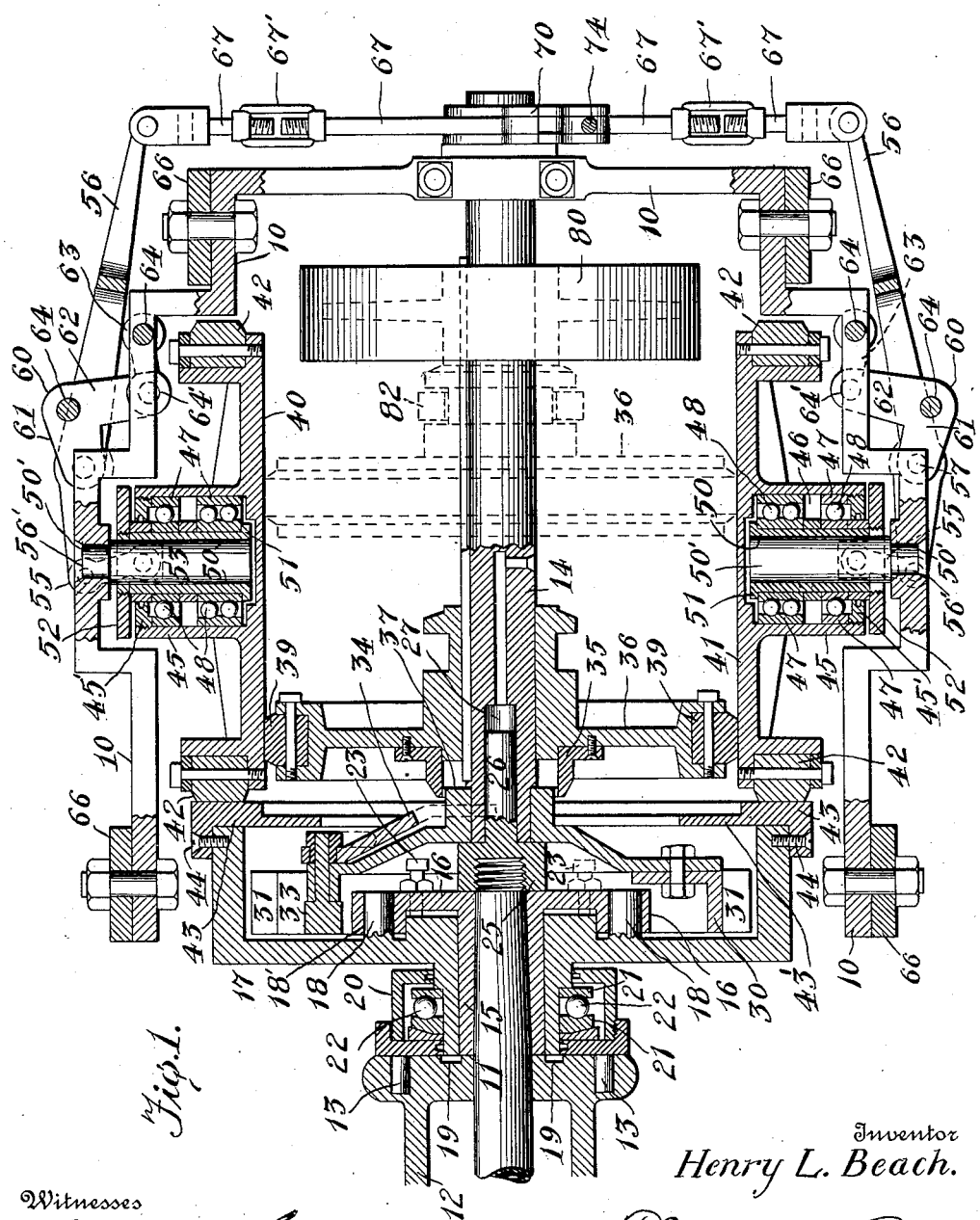

H. L. BEACH.
FRICTIONAL TRANSMISSION GEARING.
APPLICATION FILED APR. 12, 1913.

1,097,905.

Patented May 26, 1914.

3 SHEETS—SHEET 1.

Witnesses

Inventor
Henry L. Beach.
By J. Walter Fowler
Attorney

H. L. BEACH.
FRICTIONAL TRANSMISSION GEARING.
APPLICATION FILED APR. 12, 1913.
1,097,905.
Patented May 26, 1914.
3 SHEETS—SHEET 2.
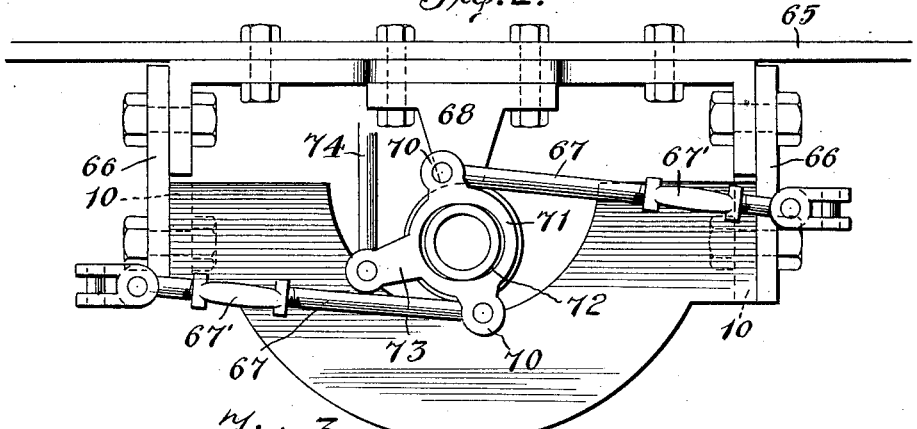
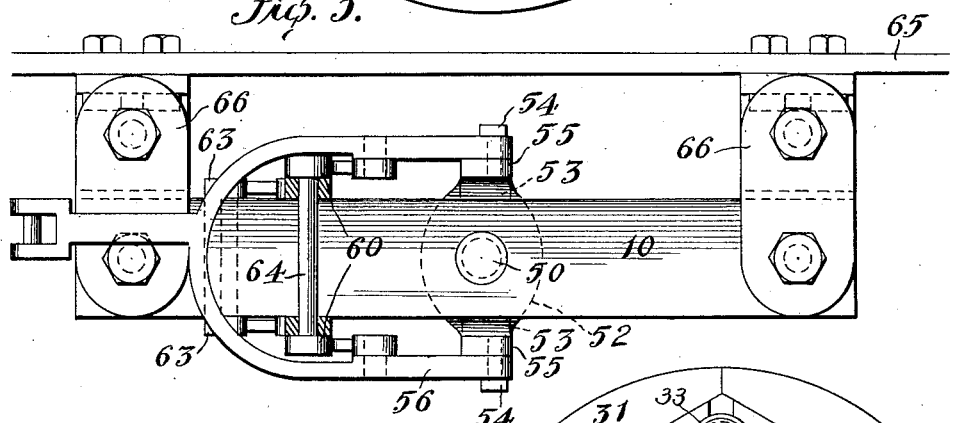
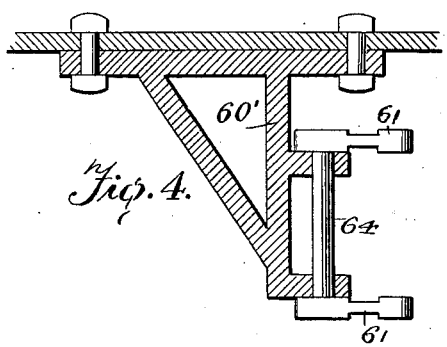
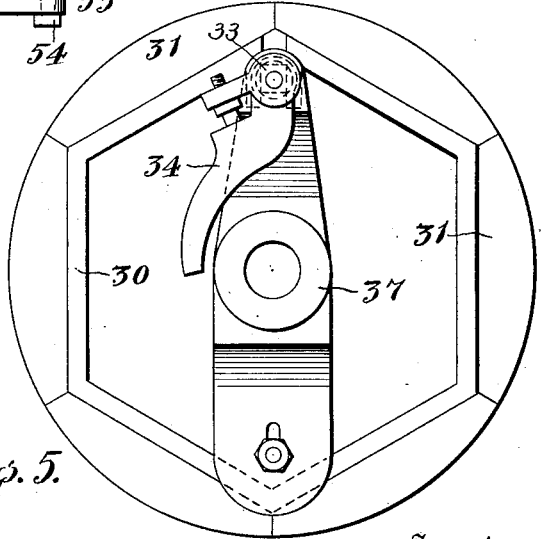
Witnesses
Inventor,
Henry L. Beach.
By T. Walter Fowler
Attorney H. L. BEACH.
FRICTIONAL TRANSMISSION GEARING.
APPLICATION FILED APR. 12, 1913.
1,097,905.
Patented May 26, 1914.
3 SHEETS—SHEET 3.
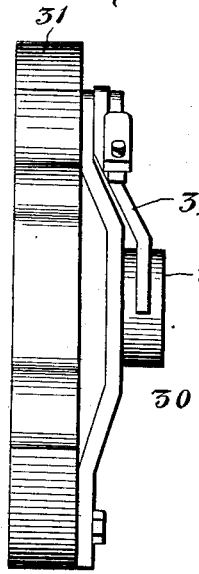
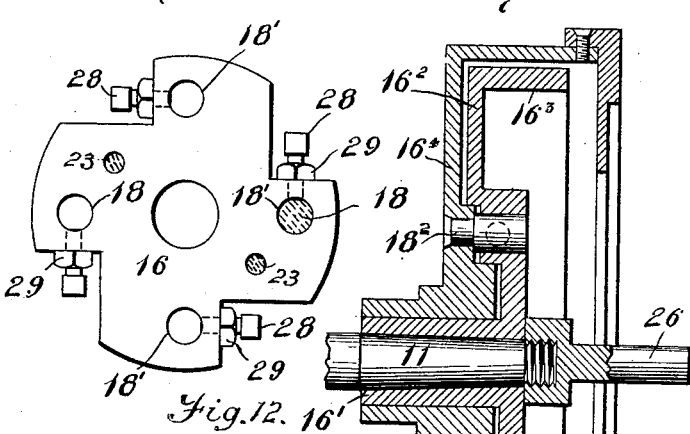
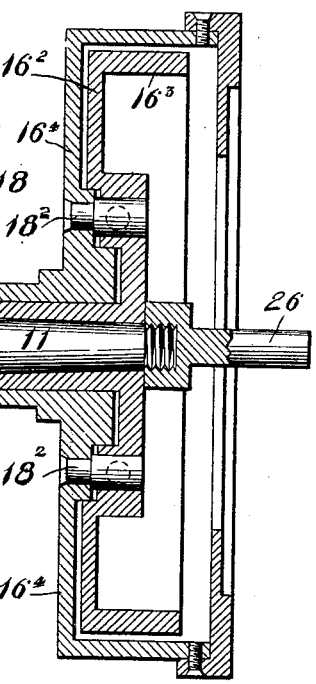
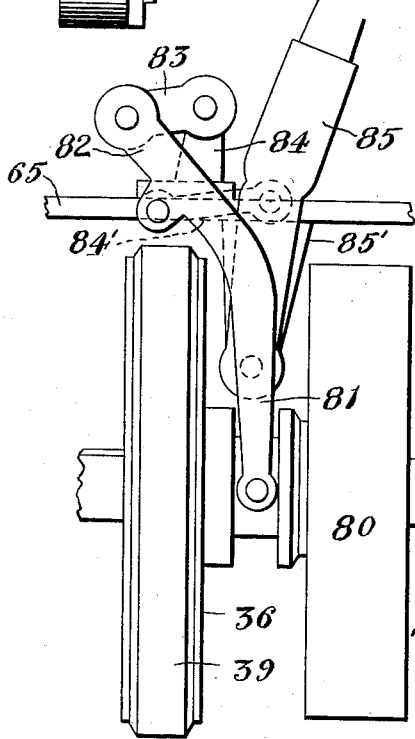
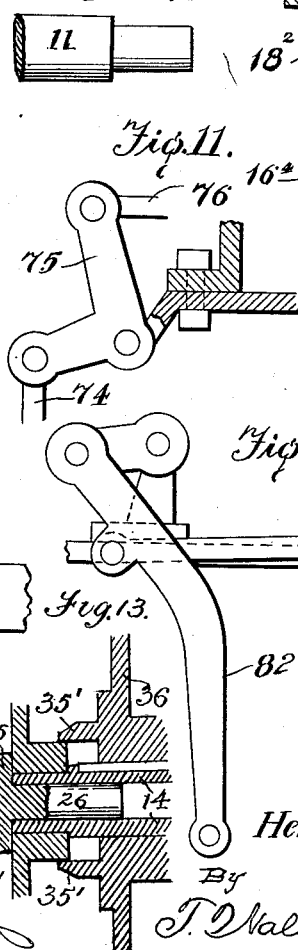
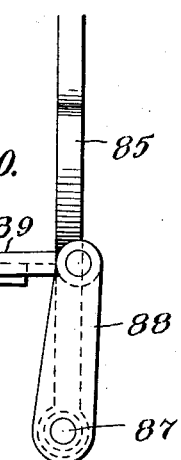
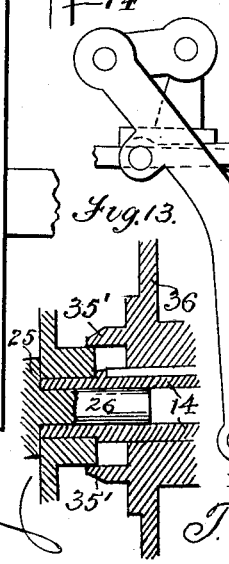
Inventor
Henry L. Beach,
By
T. Walter Fowler
Attorney
Witnesses
COLUMBIA PLANOGRAPH CO., WASHINGTON, D. C.

UNITED STATES PATENT OFFICE.

HENRY L. BEACH, OF MONTROSE, PENNSYLVANIA.

FRICTIONAL TRANSMISSION-GEARING.

1,097,905.  Specification of Letters Patent.  Patented May 26, 1914.

Original application filed December 26, 1912, Serial No. 738,677. Divided and this application filed April 12, 1913. Serial No. 760,618.

*To all whom it may concern:*

Be it known that I, HENRY L. BEACH, a citizen of the United States, residing at Montrose, in the county of Susquehanna and State of Pennsylvania, have invented certain new and useful Improvements in Frictional Transmission-Gearing, of which the following is a specification.

This invention relates to variable speed transmission mechanism especially designed for use in connection with the propulsion of motor-driven vehicles.

A leading object of the present invention is to provide a transmission mechanism wherein during the greater portion of the operation of the machine, said machine may be driven on a direct drive between the engine crank-shaft and the driven-shaft, so that during only a comparatively short period of the operation of the machine, the frictional gearing is brought into use.

Another leading feature of the invention is to so arrange the parts that the transmission mechanism may be condensed into the smallest possible space and wherein the active agencies of the transmission mechanism are practically contained within a fly-wheel in such position as to be readily accessible and which fly-wheel is utilized as a part of the clutch-mechanism for connecting the drive-shaft to the driven-shaft.

Another feature of the invention is the employment of a frictional transmission mechanism which is so arranged that during the greater portion of the operation of the car this transmission mechanism is substantially idle, thereby prolonging the life of the friction surfaces and permitting the machine to be almost entirely driven by a direct drive from the crank-shaft; and wherein the means for rendering the friction mechanism active and as the operating means for transmitting motion and power to the driven-shaft may be controlled by the operator of the car from a convenient point adjacent the operator's seat.

With the above and other objects in view my invention consists of the parts, and the constructions, arrangements, and combinations of parts which I will hereinafter describe and claim.

In the accompanying drawings forming part of this specification and in which similar reference characters indicate like parts in the several views; Figure 1 is a horizontal sectional view of a transmission mechanism embodying the salient features of my invention. Fig. 2 is a rear elevation of the same. Fig. 3 is a side elevation of a supplemental shiftable frame by which the friction transmission is carried. Fig. 4 is a detail in front elevation of one of the brackets upon which the bell-crank levers, 60, are mounted. Fig. 5 is a plan view of a clutch mechanism for connecting the drive and driven shafts. Fig. 6 is a side elevation of the same partially in section. Fig. 7 is a plan view of the flanged sleeve through which motion is communicated to the fly-wheel of the machine. Fig. 8 is a vertical sectional view of a fly-wheel showing a flanged sleeve of slightly modified form. Fig. 9 is a side elevation of a lever mechanism for shifting the friction wheel, 36. Fig. 10 is a modification of the lever mechanism of Fig. 9. Fig. 11 is a detail to be referred to. Figs. 12 and 13 are modifications to be hereinafter described.

In carrying out my invention I mount the transmission mechanism within an appropriate frame, 10, which frame may be of any suitable construction, said frame being adapted to support and sustain the operating parts of the transmission mechanism, as I will hereinafter fully set forth.

The transmission mechanism is designed to be attached to the crank case, 12, of the engine and this may be done by any suitable means, as by fitting the case to appropriate studs, 13, which enter openings in the crank case, as shown in Fig. 1. The engine crank shaft, 11, and the driven shaft, 14, are arranged directly in line and are designed to be connected together through the medium of a suitable clutch mechanism, such as I will hereinafter describe.

Referring to Fig. 1, it will be seen that the crank shaft is embraced by the hub portion, 15, of a flanged sleeve, 16, shown in detail in Fig. 7, which sleeve is designed to have its hub portion fixedly connected to the crank shaft and it has an internal bore of tapering-form adapted to fit the corresponding tapering crank shaft. This construction permits of the hub-portion of the sleeve being driven on the tapering crankshaft by a wedging action to thereby more securely hold the sleeve to the shaft. Loosely mounted on the hub-portion of the flanged sleeve is the hub of the fly-wheel, 17, said fly-wheel being of suitable dimensions and adapted to house the clutch-mechanism which connects the crank shaft to the driven-shaft, said fly-wheel having on the inner surface of its vertical web the horizontally extending studs, 18. These studs are equi-distant and are of substantial thickness and as many of them may be used as may be found desirable, said studs adapted to enter openings, 18', formed in the flange of the sleeve near the edge thereof, and through these studs the fly-wheel is connected directly to the flanged sleeve, 16, which in turn is secured by keying or otherwise directly to the crank-shaft, it being understood that the fly-wheel thus rotates with said sleeve, but is permitted to have a slight longitudinal movement upon the extended hub-portion of the sleeve, 15.

The studs, 18, may be cast integral with the fly-wheel or they may be made as separate elements suitably secured to said fly-wheel, without departing from the spirit of my invention, it being understood that in either event the studs will closely fit the holes, 18', in the flanged sleeve and that said studs will constitute the driving means for connecting the fly-wheel to the engine crank-shaft while at the same time permitting the fly-wheel to have a slight movement parallel with the axis of said shaft, this movement being provided by the hub-portion of the fly-wheel being loose upon the corresponding portion, 15, of the flanged sleeve, and by making a slight annular recess, 19, in the crank case, 12, in line with the outer end of the hub of the fly-wheel, as shown in Fig. 1.

Between the engine crank case, 12, and the fly-wheel and circumscribing the hub of said wheel, is an appropriate ball-bearing structure which is herein shown as comprising a housing or case, 20, formed of two threaded parts one of which is parallel with and fits closely against the crank case and the other lies adjacent and parallel to the inner side of the fly-wheel, said case inclosing ball-races, 21, between which suitable balls, 22, are mounted.

In order that any wear which may occur in the ball-races may be taken up or compensated for and the fly-wheel thus held perfectly true under working conditions, I provide for the aforesaid horizontal sliding movement of the fly-wheel on the hub of the flanged sleeve, 16, and for a longitudinal sliding movement of the studs, 18, in their respective openings in the flanged portion of said sleeve, and I obtain the necessary movement and adjustment referred to by means of set screws, 23, which are mounted in the sleeve, and have their inner ends bearing against the fly-wheel, said screws being held after the necessary adjustment has been obtained, by means of lock nuts, of any suitable character. By the means described or others of an equivalent character, any wear which might arise in the ball-bearing heretofore described can be readily taken up while the accurate running of the fly-wheel at all times is provided for; also, any lateral pressure brought upon the fly-wheel by the friction disks hereinafter mentioned, will be sustained by said ball-bearing.

In order that the crank-shaft, 11, and the driven-shaft, 14, may be accurately alined, it is desirable that the crank-shaft be extended into the driven-shaft and to this end I have shown in Fig. 1, a nut, 25, threaded on the end of the crank-shaft and having an extended portion 26, of substantial length entering a corresponding socket or bearing, 27, formed in the adjacent end of the driven-shaft; it will be readily understood, however, that this extension of the crank-shaft, into the driven-shaft may be effected by extending the length of the crank-shaft so as to make the extension, 26', as an integral portion thereof, in which case it will only be necessary to turn down this extended portion, 26', as shown in Fig. 12, to form the part which enters the socket in the driven-shaft. Either construction may be used without departing from the salient features of my invention.

To provide for any wear on the studs which might reduce the diameter of the said studs and thus provide for a slight movement of the flanged sleeve, and in order to hold the sleeve rigidly to the fly-wheel while allowing for the horizontal sliding movement of said wheel, as before explained, I may flatten the studs, 18, on one side and engage these flattened portions by set screws, 28, which are mounted in the flanged sleeve and are held in locked position after adjustment by means of jam-nuts, 29, or like fastenings.

The fly-wheel is connected to the driven-shaft by means of a suitable clutch mechanism and a clutch suitable for my purpose is shown in Fig. 5, as comprising a casting or frame, 30, having a periphery formed of one or more segmental blocks, 31, forming a rim covered by some appropriate friction material, said casing or frame being split or divided at one side, whereby the casting or frame, 30, and its rim are capable of expansion to bring the periphery of the block or blocks, 31, into intimate and driving contact with the inner circumference of the fly-wheel.

As shown in Fig. 5, the clutch is operated by a suitable cam block, 33, fixed to a lever, 34, and interposed between the divided portions of the clutch and adapted to expand the clutch when the lever is operated, said lever being herein shown as of curved form having its free end positioned to be operated upon by the wedge-shaped end, 35, of a shiftable or change speed friction wheel, 36, which I will presently describe. The clutch member herein shown and described is but one embodiment of a device which I may adopt for my purpose, and it forms no essential part of my present invention.

The clutch frame, which is of disk-form, is provided with a hub portion, 37, which is fixed to the front end of the driven-shaft, 14, and the outer and active portion of the clutch is housed within the fly-wheel, which fly-wheel is herein shown as capable of holding a lubricant in which the cam-block and outer end of the lever may dip to thereby insure the automatic lubrication of said parts.

The change speed friction wheel, 36, is shiftably mounted on the driven-shaft by splining or otherwise fixing it thereto so that it may move longitudinally on the shaft, and its beveled or wedge-shaped end, 35', which operates the lever, 34, of the clutch may be formed as an integral portion of the wheel, as shown in Fig. 13, or it may, as shown at 35 in Fig. 1, be made a separate part of the wheel, in which case it would be in the form of a flanged annulus bolted or otherwise fixed to the wheel, as shown in Fig. 1, said wheel having its periphery constructed to removably receive the friction annulus or rim, 39, which may be made in any suitable manner and of any material best suited for producing a friction drive, said annulus or rim adapted to frictionally engage the inner plane surface of the opposed vertical rotatable friction disks, 40, 41, said disks being arranged one at each side of the driven-shaft, 14, and just inside of the side portions of the frame, 10, and with their inner plane surfaces parallel with each other and with said shaft. The distance between the plane or friction faces of the opposed wheels, 40, 41, is just equal to the outer diameter of the annulus or friction rim, 39, carried by the shiftable friction wheel, said wheel adapted to be shifted along the faces of the opposed parallel friction wheels, 40, 41, toward and from the center thereof, to change the speed at which the machine may be driven, in the manner well known in the art of frictional gearing, it being understood that the friction wheel may be moved past the center of the friction disks, as indicated in dotted lines in Fig. 1, whenever it is desired to reverse the direction of motion of the machine.

Each friction disk, 40, 41, has its periphery formed of a removable annulus or friction rim, 42, adapted to frictionally engage a corresponding surface, 43, secured to the outer side of the fly-wheel, 17, and which latter surface may be removable by providing screws, 44, or other fastenings by which it is detachably fitted to said fly-wheel. The engaging surfaces, 42, 43, just referred to may be of any material found best suited for a friction drive, and the friction surface, 43, may be a plate or open center disk of substantially right-angled cross section and provided with an inwardly extending flange, 43', which by extending over the inner edge of the fly-wheel forms an inclosing chamber for the circumferential or rim portion of the clutch, which is thereby substantially housed within the fly-wheel, but which is readily accessible through the open center of the plate or disk, 43.

Each of the opposed friction disks, 40, 41, is provided with a hub portion, 45, of substantial diameter into the outer end of which is screwed or otherwise fitted a plate, 45', which incloses the outer end of the chamber, 46, formed by said hub portion. In this chamber are placed suitable blocks, 47, forming race-ways for the balls, 48, there being in the outer portion of said chamber, a single annular series of balls while in the inner part of the chamber I have shown a double annular series of balls, the balls of each series being suitably confined between the opposed ball-races, 47, in such manner that the balls take up the thrust in all directions and thus insure the accurate free running of the friction disks, 40, 41. The type of ball bearing referred to and shown in Fig. 1 may be considered as but one embodiment of a ball-bearing which I may use in my improved transmission, but it will be understood that this particular type of bearing forms no essential part of the present invention and is not herein specifically claimed, and that any ball bearing suitable for the purpose I have in view may be used as a substitute for the bearing shown.

Placed interiorly to the hub of each friction disk, 40, 41, and interiorly to the innermost of the blocks or rings, 47, which form the races for the ball-bearings is a sleeve, 50, the inner end, 51, of which is flanged so as to bear against the innermost of the ball-races or rings, 47, said sleeve being supported on steel studs, 50', rigid with and projecting from the inner side of the frame, 10, said sleeve being non-rotatable and being adapted to thereby have a slight movement on said studs, 50', parallel with its axis and at right angles to the driven-shaft, 14, sufficient space being provided at each end of the sleeve for this purpose. The studs, 50', permit the friction disks, 40, 41, to be moved toward and from the change speed wheel, 36, and they support said disks and also take the strain of the thrust from the fly-wheel.

The outer end of the sleeve, 50, has fixed to it a plate or bar, 52, which is provided with inwardly extending lugs, 53. To these lugs are pivotally mounted by bolts, 54, or otherwise, the short links, 55, said links having their outer ends pivotally connected to the inner short arms of the levers, 56, said levers being pivoted at 57 and the inner portions of the levers being forked so that the levers may straddle the adjacent portion of the supporting frame, 10, of the transmission mechanism, as shown in Fig. 3, it being understood that this provides for the employment of a pair of spaced links, 55, on the inner ends of the forked levers, 56. In other words, each lever has its inner end connected to the plate or bar, 52, at top and bottom or at points substantially above and below the frame, 10.

To the vertical portion of each of the levers, 56, and pivotally mounted thereon are upper and lower bell-crank levers, 60, one arm, 61, of each of which extends substantially parallel with the frame, 10, while the other arm, 62, extends inwardly of this frame, the frame being preferably offset at this point as shown in Fig. 1, and the second-named arm, 62, of the lever being connected to one end of a horizontally-extending link, 63, which is bolted or otherwise fixed to the frame, 10, by means of bolt, 64. The bell-crank levers are mounted on brackets, 60' (Fig. 4), which in turn are securely fixed by bolting or otherwise, to the frame of the car, the bolt, 64, on which the bell-crank levers turn being in fact a fixed point on the car frame. The bell-crank levers are connected in pairs by means of the pins or bolts, 64, as shown in Figs. 3 and 4, and it will be understood that there will be one of the levers, bell-cranks, and connections, as described, at each side of the frame; in other words, the mechanism heretofore described for one side of the frame is duplicated at the opposite side and the outer ends of the levers, 56, at opposite sides of the frame are designed to be connected together so that the levers may be operated in unison as I will presently describe.

The frame which carries the transmission mechanism is designed to be suspended from the frame, 65, of the car as shown in Fig. 3, so that the transmission frame, 10, may have a slight movement in a horizontal plane to carry the friction surfaces, 42, into and out of driving engagement with the corresponding friction surface, 43, of the fly-wheel, when it is desired to operate the car by a frictional drive, and to allow the frictional surfaces, 42, of the disks, 40, to be moved away from the friction surface, 43, of the fly-wheel when it is desired to drive the machine by direct drive, which may be resorted to during the greater period of time the car is in motion. This enables me to maintain the frictional surfaces idle during the greater portion of the running of the car and consequently reduces to a minimum the wear and the cost of maintenance of these most expensive parts of a frictional transmission mechanism.

That the foregoing movements may be obtained I connect the opposite ends of each side of the transmission frame, 10, to vertical links, 66, the upper portions of which are in turn pivotally connected to some portion of the frame or chassis of the car. The outer ends of the levers, 56, are pivotally connected to rods, 67, at the rear of the transmission mechanism, said rods being shown in Fig. 1, as extending inwardly toward the center line of the frame, 10, and having their inner ends appropriately connected to lugs, 70, formed at opposite points on the periphery of a collar or sleeve, 71, which is turnable on a reduced portion of the end of a box or bearing, 68, which supports the rear end of the driven-shaft, 14, said collar or sleeve having an opening, 72, which receives the reduced portion of the box or bearing of substantially oval form; that is, the opening, 72, has a minor vertical axis which is equal to the external diameter of the reduced end portion of the box or bearing whereby the sleeve bears upon this portion of the box at two opposite points. The major axis of the opening, 72, is slightly greater than the minor axis and is horizontal, whereby a space is provided at each side of the shaft to enable the collar or sleeve to have a slight lateral movement, for purposes which I will hereinafter describe. The sleeve or collar, also, has a short arm, 73, projecting from it at a point about midway of the other arms, 70, and to this short arm is connected a rod, 74, which extends to one arm of a bell-crank lever, 75, suitably fulcrumed on the frame of the machine, as shown in Fig. 11, and having its other arm connected to a rod, 76, which extends to the usual operator's foot-lever, (not shown), whereby when said lever is operated the bell-crank lever, 75, is rocked about its fulcrum and the sleeve or collar, 71, is turned about the outside of the box or bearing, as an axis and the rods, 67, are moved in opposite directions to force the outer ends of the levers, 56, apart, thereby causing these levers to first swing about the fulcrum point, 57, and the short arms of the levers to push upon the links, 55, which connect the levers with the bars or plates, 52, and by these plates engaging the hubs of the friction disks, they push the friction disks inwardly on the studs, 50', so that their plane faces will be forced into frictional contact with the rim of the shiftable friction wheel, 36. When the frictional disks, 40, 41, come to a stop against the friction surface or rim of the wheel, 36, and a further pressure is placed upon the levers, 56, by the operator and through the connections before described, the fulcrum points of the levers are changed and the levers will now swing upon the pins, 56', which connect their short arms to the links, 55, with the result that the bell-crank levers, 60, are now rocked about the bolts or pivots, 64, and the long arms of these levers are moved horizontally and through the link connections, 63, the swinging frame, 10, is moved horizontally to carry the friction surfaces or rims of the disks, 40, 41, against the corresponding friction surface of the fly-wheel, it being understood that the short arms of the bell-crank levers, 60, are connected to the levers, 56, by the pins or bolts, 57, before mentioned.

The arrangement shown and described is such that the distance between the points, 56' and 57 is about equal to one third the distance between the point, 56', and the pivotal point of the outer end of the lever, 56, and the bolt or point, 57, being the fulcrum of the lever, 56, any number of pounds pressure exerted on the outer ends of the lever will be multiplied three times at the point 56'. Now, when the outer or long arms of the levers, 56, are moved outwardly, the disks, 40, 41, will be moved inwardly until they come against the rim of the shiftable friction wheel, 36, but up to this time no substantial pressure has been applied to the outer ends of the levers. But, if a ten pound pressure is now brought against the outer ends of the levers, 56, there will occur about a thirty (30) pound pressure at the fulcrum points, 56', and about a forty (40) pound pressure at the point, 57. If the distance between the points, 57 and 64, and between 64 and 64', (at which latter point the arms, 62, of the bell-cranks are connected to the links, 63), is the same, there would result say a forty (40) pound pressure at the point, 64', which would be about ten (10) pounds too much for my purpose; hence I prefer to make the arms, 62, of the bell-crank levers say about one-fourth (¼th) longer than the arms, 61, and accordingly, I thus equalize the pressure as I then obtain say a thirty (30) pound pressure at the points 56' and 64'. The pressure upon the fly-wheel, friction surface and upon the rim of the shiftable friction wheel, 36, are therefore about equal. It will also be observed, in this connection, that friction disk, 43, on the fly-wheel has a greater diameter than that of the shiftable friction wheel, 36, and therefore, a trifle less pressure is required on the said disk to do the same amount of work. For this reason I prefer to make the arms, 62, of the bell-cranks slightly more than one-fourth (¼th) longer than the arms, 61, as before explained, it being understood that during the movements specified, the frame, 10, is, through the links, 63, and 66 caused to move horizontally to bring the friction rims of the disks, 40, 41, into driving connection with the friction disk or surface, 43, of the fly-wheel.

In the construction specified, turn-buckles, 67', let into the length of the rods, 67, are also important because it is the function of these turn-buckles to keep the operator's foot-lever in its relative position and this may be done by the adjustment of the turn-buckles to take up any wear of the friction surfaces, or other parts, so as to maintain uniformity of friction. If, however, by reason of oversight, or otherwise, there should be an uneven friction at opposite sides of the transmission mechanism during the operation of the car, this may be compensated for and taken up by the provision of the oval space, 72, in the sleeve of collar, 71, as this space enables the sleeve or collar, to which the rods are connected which actuate the levers and the friction wheels, 40, 41, to shift laterally in response to an uneven pressure of either of the levers, whereby pressure applied through the foot-lever and connections specified will be equally distributed through the levers, 56, to the friction disks, 40, 41, and uniform application of pressure at both sides of the friction wheel will be effected. The shiftable movement thus provided for the sleeve or collar, 71, is also of importance, if from carelessness, or otherwise, in the adjustment of the turn-buckles, one of these parts might be given a greater movement than the other. In other words, if there should be an unequal turning of the turn-buckles, there might arise a little more pressure on one side of the transmission mechanism than on the other, and if this should arise, the slight movement afforded the sleeve or collar by reason of its oval-shaped opening, will compensate for any irregularity in the pressure and thus automatically provide for an equalization of pressure at both sides of the transmission mechanism.

Another feature of some importance in a frictional transmission mechanism is the provision which I make for the use of a brake wheel, 80, on the driven shaft, and the fact that I may use a mechanism for shifting the friction wheel, 36, without resorting to the use of long rods and equivalent parts. As shown in Fig. 9, the friction wheel, 36, has its hub portion provided with an annular groove adapted to be engaged by the yoke end, 81, of a lever, 82, shown in Fig. 9, said lever being preferably of a curved type having its upper end pivotally connected to a link, 83, which in turn is pivotally mounted on a stud, 84, fixed to some fixed part of the frame of the car. Between its ends the lever, 82, has its opposite end pivotally connected to an operating hand lever, 85, which extends up through the center of the car, said hand lever having its lower end pivotally connected to a bracket, 85', projecting downwardly from the car frame, 65. From this description it will be apparent that when the hand lever is operated in one direction, the lever, 82, is moved to slide the friction wheel on the driven-shaft in one direction, and when the hand-lever is operated in another direction, it moves the friction wheel along the shaft in an opposite direction. This enables me to utilize a brake-wheel and employ a lever for operating said friction wheel, the lever being disposed between the brake wheel and the friction wheel. In the arrangement shown the hub of the brake wheel may serve as a stop or abutment for the movement of the friction wheel in the reverse direction.

In some instances the hand lever may be located at the side of the car in which case its lower end will be attached to a horizontal shaft, 87, as shown in Fig. 10, said shaft carrying a vertical arm, 88, to which is connected a link, 89, which extends to and pivotally connects with the lever, 82, whereby the rocking of the shaft, 87, results in the friction wheel being moved on the driven-shaft in one direction or the other.

In Fig. 8, I have shown a modification of the flanged sleeve which is fixed to the crank-shaft and which has openings to receive the studs, $18^2$, which serve as the means for connecting a friction disk, $16^4$, to the drive-shaft, said sleeve, $16'$, in the instance noted, being provided with an extension, $16^2$, lying parallel with the vertical face of the friction disk, and having an annular or rim portion, $16^3$, which is concentric with and lies within the rim of the friction disk. In this instance, sleeve, $16'$, of the flanged disk, which is regarded as the equivalent of the fly-wheel of Fig. 1, is securely fastened and keyed direct to the crank-shaft (same as the sleeve, 15, in Fig. 1), and mounted upon its hub portion is the friction disk, $16^4$, which is free to move longitudinally, said disk being driven by the studs, $18^2$ and set screw adjustments being provided both for taking up lost motion in the ball-bearings and in the studs, the same as described for the construction shown in Fig. 1.

From the foregoing description it will be understood that during the greater portion of the operation of the machine, I am enabled to operate the machine by a direct drive from the engine crank-shaft, the frictional gearing heretofore mentioned, being thus idle; but when desiring to run on low speed, the friction gearing may be brought instantly into action by the operation of the hand-lever, 85, when the drive will be from the engine crank-shaft through the fly-wheel and the friction wheels, 40, 41, and interposed shiftable friction wheel to the driven-shaft. In starting the machine the shiftable friction wheel may be moved outwardly over the faces of the friction wheels, 40, 41, until when near the outer periphery of these wheels, the beveled or wedge portions, 38, of the shiftable friction wheel will engage the clutch lever, 34, and thus operate the clutch to lock said clutch to the fly-wheel and thus produce a direct drive, it being understood that in this position the operator's foot lever has been released to remove the swinging frame so that the rims or frictional surfaces of the disks, 40, 41, are removed from driving connection with the friction surface of the fly-wheel. In throwing the friction disks, 40, 41, into driving engagement with the fly-wheel, the pressure of these disks is transmitted through the fly-wheel to the ball-bearings directly and pressure upon these bearings is resisted by the engine crank-case, 12, which is regarded as the most rigid part of the machine. It will also be understood that the separate nut, 25, with its extension which enters a bore or socket in the driven-shaft, is used primarily when my improved transmission mechanism is to be applied to cars already in use. In the case of a new car, the crank-shaft may be extended to form the projecting end which fits in the socket of the driven-shaft, as shown in Fig. 12.

The frame, 10, which supports the transmission mechanism, is hung under the frame of the car and supported by the links, 66, so that it is free to move forward to bring the rims of the friction wheels into contact with the fly-wheel. The movement of this frame is slight and only sufficient movement is necessary to insure proper engagement and disengagement of the friction surfaces. It will be also noted that in my construction I have brought the parts within a very small compass, a matter of importance in a frictional transmission mechanism; and that the arrangement is such that the moment I go into a direct drive, the friction wheels, 40, 41, come to a standstill; in other words, they are idle for about 90% of the time, but they are in such position that they may be brought into instant use when wanted.

The clutch mechanism herein shown and described in connection with the frictional transmission gearing, forms no essential part of the present invention and it is the subject matter of the claims of my former application, filed December 26, 1912, Serial Number 738,667, of which the present application is a division.

Having thus described my invention what I claim as new and desire to secure by Letters Patent is:—

1. In a transmission gearing, the combination with a drive-shaft, a fly-wheel driven therefrom, said fly-wheel having a friction surface on one side, and a driven shaft, of a frictional transmission mechanism between the fly-wheel and the driven-shaft, said transmission mechanism comprising opposed friction disks having parallel plane faces and having friction rims presented toward the friction surface of the fly-wheel, a change speed friction wheel interposed between said disks and slidably mounted on the driven-shaft, and means for moving the friction rims of said disks into and out of driving connection with the friction surface of the fly-wheel, said means including a lever fulcrumed on a fixed part and a second lever fulcrumed on the first named lever and connected to one of said opposed friction disks.

2. In a transmission gearing, the combination with a driven-shaft, a fly-wheel, and means for operating the same, said fly-wheel having a friction surface on one side, of a frictional transmission mechanism between the fly-wheel and the driven-shaft, said mechanism comprising opposed parallel friction wheels one at each side of the driven-shaft, a change speed friction wheel interposed between said disks and slidably mounted on the driven-shaft, said disks having friction rims opposing the friction surface of the fly-wheel, and said shiftable wheel having a friction rim opposing the disks, and means for moving the disks into engagement with the rim of the shiftable friction wheel and for moving the friction rims of said disk into driving contact with the friction surface of the fly-wheel in unison with the engagement of the disks with the shiftable friction wheel, said last named means including bell-crank levers fulcrumed on fixed parts and levers fulcrumed on the bell-crank levers and connected to said opposed friction disks.

3. In a transmission gearing, the combination with a fly-wheel and means for operating the same, of a shaft to be driven, said fly-wheel having a friction surface on one side, a friction transmission mechanism between the fly-wheel and the shaft to be driven, said mechanism comprising a freely suspended frame capable of a swinging movement in a horizontal plane, a pair of parallel friction disks carried by said frame and disposed one on each side of the shaft to be driven, said friction disks adapted to have a movement toward and from each other and having friction rims presented toward the friction surface of the fly-wheel, a shiftable friction wheel on the shaft to be driven, having a friction rim disposed adjacent the faces of said disks, levers connected to the disks for moving said disks in unison to bring their plane faces into frictional driving engagement with the rim of the shiftable friction wheel, and other levers fulcrumed to fixed parts for moving the friction rims of the disks into driving engagement with the friction surface of the fly-wheel, said first-named levers being fulcrumed on the second-named levers.

4. In a transmission gearing, the combination with a fly-wheel and means for operating the same, of a shaft to be driven, said fly-wheel having a friction surface on one side, a friction transmission mechanism between the fly-wheel and the shaft to be driven, said mechanism comprising a suspended frame capable of swinging movement in a horizontal plane, a pair of parallel friction disks carried by said frame and disposed one on each side of the shaft to be driven, said friction disks adapted to have a movement toward and from each other and having friction rims presented toward the friction surface of the fly-wheel, a shiftable friction wheel on the shaft to be driven, having a friction rim disposed adjacent the faces of said disks, means for moving the disks in unison to bring their plane faces into frictional driving engagement with the rim of the shiftable friction wheel and for moving the friction rims of the disks into driving engagement with the friction surface of the fly-wheel, said means comprising bell crank levers fulcrumed to fixed parts and levers fulcrumed on the bell-crank levers and connected to the opposed friction disks, and an operating hand lever and connections between the same and the levers for operating both disks in unison.

5. An automobile transmission gearing, combining a direct and a friction drive, said gearing including a drive-shaft, a fly-wheel and means driving it from said shaft, a driven-shaft a clutch mechanism between said shafts, serving to connect one with the other, opposed friction disks one at each side of the driven-shaft, and rotatable in a plane at right-angles to the rotation thereof, a change speed friction wheel shiftable on the driven-shaft having its rim normally disposed adjacent said disks, and means for imparting to the disks in unison a combined movement toward and in contact with the change-speed wheel and toward and in contact with the fly-wheel, said means including a pair of levers for each friction disk, one of said levers being fulcrumed to a fixed part and the other lever being fulcrumed on the first-named lever, and connected to said disk.

6. An automobile transmisison gearing, combining a direct and a friction drive, said gearing including a drive shaft, a fly-wheel and means driving it from said shaft, a driven-shaft, a clutch mechanism between said shafts serving to connect one with the other, opposed friction disks one at each side of the driven-shaft and rotatable in a plane at right-angles to the rotation thereof, a change-speed friction wheel shiftable on the driven-shaft having its rim normally disposed adjacent said disks, and means for imparting to the disks in unison a combined movement toward and in contact with the change speed wheel and toward and in contact with the fly-wheel, said means including a lever connected to each disk and imparting a movement thereto parallel with its axis, a bell-crank lever fulcrumed on a fixed part and connected to one of the first-named levers for moving the disks at right-angles to said first movement and toward and from the fly-wheel, said first-named lever being fulcrumed on the second lever, and an operating lever and connections for actuating the first-named levers.

7. In an automobile transmission gearing, the combination with an engine shaft, a fly-wheel, means for driving the fly-wheel from the engine shaft, a driven-shaft, a change speed wheel shiftably mounted thereon, and a clutch mechanism serving as a direct drive between said shafts, of a friction drive mechanism mounted for bodily movement in two directions one substantially at right-angles to the other, one of said movements being toward and from the change speed wheel, and the other movement being toward and from the fly-wheel, said movements being substantially in unison, said friction drive mechanism including a pair of connected levers at each side of the transmission, one of said levers being a bell-crank and fulcrumed to a fixed part, and the other lever being fulcrumed on the bell-crank lever, and a unitary mechanism within the control of the operator and connected to said lever mechanism for imparting both movements to the friction drive mechanism by a single application of power in one direction.

8. In an automobile transmission gearing, the combination with an engine shaft, a fly-wheel, means for driving the fly-wheel from the engine shaft, a driven-shaft, a change speed wheel shiftably mounted thereon, and a clutch mechanism serving as direct drive between said shafts, of a friction drive mechanism mounted for bodily movement in two directions one substantially at right-angles to the other, one of said movements being toward and from the change speed wheel, and the other movement being toward and from the fly-wheel, said friction drive mechanism comprising a lever fulcrumed to a fixed part and a second lever fulcrumed on the first lever and connected to said mechanism, said clutch mechanism having a part extended into the range of movement of the change speed wheel and actuated by said wheel to release the clutch substantially simultaneously with the engagement of the friction drive mechanism with the change speed wheel and fly-wheel respectively.

9. In an automobile transmission gearing, the combination with an engine shaft, a fly-wheel, means for driving the fly-wheel from the engine shaft, a driven-shaft, a change-speed wheel shiftably mounted thereon, and a clutch mechanism serving as a direct drive between said shafts, of a friction drive mechanism mounted for bodily movement in two directions one substantially at right-angles to the other, one of said movements being toward and from the change-speed wheel, and the other movement being toward and from the fly-wheel, and a lever mechanism within the control of the operator for imparting both movements to the friction drive mechanism by the single application of power in one direction, and means associated with said lever mechanism for automatically compensating for different pressures of the friction drive mechanism at opposite sides of the driven-shaft.

10. In an automobile transmission gearing, the combination with an engine shaft, a fly-wheel, means for driving the fly-wheel from the engine shaft, a driven-shaft, a change-speed wheel shiftably mounted thereon, and a clutch mechanism serving as a direct drive between said shafts, of a friction drive mechanism mounted for bodily movement in two directions one substantially at right-angles to the other, one of said movements being toward and from the change-speed wheel, and the other movement being toward and from the fly-wheel, and means for automatically compensating for different pressures of the friction drive mechanism at opposite sides of the driven-shaft, said last-named means comprising a lever mechanism connected with the friction drive mechanism and a sleeve turnably mounted on the driven-shaft and having an opening of greater diameter than the shaft in one direction to permit of a lateral movement of the sleeve relatively to the shaft, means connecting opposite portions of the sleeve to the lever mechanism and manually operating means connected to the sleeve for imparting rotation thereto.

11. In an automobile transmission gearing, the combination with an engine shaft, a fly-wheel, means for driving the fly-wheel from the engine shaft, a driven-shaft, a change speed wheel shiftably mounted thereon, and a clutch mechanism serving as a direct drive between said shafts, of a friction drive mechanism and means for bodily moving the friction drive mechanism in two directions one substantially at right-angles to the other, said means comprising a movable frame, a lever mechanism connected to the friction drive mechanism and moving the same into and out of engagement with the change speed wheel, a bell-crank lever having one portion connected to the lever mechanism and another portion connected to said frame adapted to move the friction drive into and out of engagement with the fly-wheel in unison with the engagement of the friction mechanism with the change speed wheel.

12. In an automobile transmission gearing, the combination with an engine shaft, a fly-wheel, means for driving the fly-wheel from the engine shaft, a driven-shaft, a change speed wheel shiftably mounted thereon, and a clutch mechanism serving as a direct drive between said shafts, of a friction drive mechanism mounted for bodily movement in two directions, one substantially at right-angles to the other and one of said movements being toward and from the change speed wheel, and the other movement being toward and from the fly-wheel, and means for shifting the change speed wheel, said last means comprising a pivoted lever suspended from a fixed point, a manually operated lever and a link connecting with the first-named lever.

13. An automobile transmission mechanism having in combination a fly-wheel; means for driving the same; a driven shaft clutch mechanism between the fly-wheel and driven-shaft; a shiftable change speed wheel on the driven-shaft; a suspended transmission frame mounted for reciprocal movement toward and from the fly-wheel; friction disks mounted in the frame and movable therewith; studs projecting inwardly from the frame toward the driven-shaft; said disks having hub portions with ball-bearings mounted on said studs adapted to sustain the thrust on the disks; a lever mechanism connected to the frame for moving the disks on said studs toward and from the change speed wheel; and for moving the disks toward and from the fly-wheel, said mechanism comprising a bell-crank lever fulcrumed to a fixed part and a lever fulcrumed on the bell-crank lever and connected to one of the friction disks.

14. An automobile transmission mechanism having in combination, a fly-wheel; means for driving the same; a driven-shaft; clutch mechanism between the fly-wheel and driven-shaft; a shiftable change-speed wheel on the driven shaft; a suspended transmission frame mounted for reciprocal movement toward and from the fly-wheel; friction disks mounted in the frame and movable therewith; studs projecting inwardly from the frame toward the driven shaft, said disks having hub portions with ball-bearings mounted on said studs adapted to sustain the thrust on the disks; a lever mechanism connected to the frame for moving the disks on said studs toward and from the change speed wheel; and means associated with the lever mechanism and actuated thereby for moving the frame into engagement with the fly-wheel in unison with the movement of the disks into engagement with the change speed wheel, said last-named means including bell-crank levers suspended from a fixed point having one arm connected to said frame and another arm connected to said lever mechanism.

15. An automobile transmission mechanism having in combination, a fly-wheel; means for driving the same; a driven shaft; clutch mechanism between the fly-wheel and driven shaft; a shiftable change speed wheel on the driven-shaft; a suspended transmission frame mounted for reciprocal movement toward and from the fly-wheel; friction disks mounted in the frame and movable therewith; studs projecting inwardly from the frame toward the driven-shaft, said disks having hub portions with ball-bearings mounted on said studs adapted to sustain the thrust on the disks, a lever mechanism connected to the frame for moving the disks on said studs toward and from the change-speed wheel; and means associated with the lever mechanism and actuated thereby for moving the frame into engagement with the fly-wheel in unison with the movement of the disks into engagement with the change speed wheel, said last-named means including bell-crank levers suspended from a fixed point having one arm connected to said frame and another arm connected to said lever mechanism, said fly-wheel having a friction surface of larger diameter than that of the change speed wheel, and one of the arms of said bell-crank levers having greater length than the other whereby the pressure on the fly-wheel and change speed wheel is equalized.

16. In a transmission gearing, the combination with a drive-shaft, a driven-shaft alined therewith and a shiftable change speed wheel carried by the driven shaft, of a fly-wheel, connections between the fly-wheel and drive-shaft for operating the former, a clutch mechanism between the fly-wheel and the driven-shaft and serving as the direct drive therebetween, a suspended frame, friction disks thereon adapted to simultaneously engage the fly-wheel and change speed wheel, and a lever mechanism for moving the frame in one direction and simultaneously therewith moving the friction disks at right-angles to said movement, said lever mechanism including devices for equalizing the pressures applied by the disks to the fly-wheel and change speed wheel.

In testimony whereof I affix my signature in presence of two witnesses.

HENRY L. BEACH.

Witnesses:
E. F. Dodd,
T. H. Brandon.

---

Copies of this patent may be obtained for five cents each, by addressing the "Commissioner of Patents, Washington, D. C."